United States Patent
Kawamura et al.

(10) Patent No.: US 9,812,895 B2
(45) Date of Patent: Nov. 7, 2017

(54) IN-VEHICLE CHARGER

(71) Applicant: Mitsubishi Electric Corporation, Tokyo (JP)

(72) Inventors: Mao Kawamura, Tokyo (JP); Masayuki Kato, Tokyo (JP); Mamoru Takikita, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 106 days.

(21) Appl. No.: 14/911,054

(22) PCT Filed: Mar. 14, 2014

(86) PCT No.: PCT/JP2014/056895
§ 371 (c)(1),
(2) Date: Feb. 9, 2016

(87) PCT Pub. No.: WO2015/052945
PCT Pub. Date: Apr. 16, 2015

(65) Prior Publication Data
US 2016/0204648 A1   Jul. 14, 2016

(30) Foreign Application Priority Data
Oct. 9, 2013   (JP) .................................. 2013-211487

(51) Int. Cl.
*H02J 7/00* (2006.01)
*H02J 7/14* (2006.01)
(Continued)

(52) U.S. Cl.
CPC .............. *H02J 7/14* (2013.01); *B60L 11/1805* (2013.01); *B60L 11/1812* (2013.01);
(Continued)

(58) Field of Classification Search
CPC ........ Y02E 60/12; H02J 7/0042; H02J 7/0045; H01M 10/46; H01M 10/44
(Continued)

(56) References Cited

U.S. PATENT DOCUMENTS

| 4,172,277 A | 10/1979 | Pinson |
| 4,359,679 A | 11/1982 | Regan |

(Continued)

FOREIGN PATENT DOCUMENTS

| EP | 0880220 A2 | 11/1998 |
| JP | 1-295675 A | 11/1989 |

(Continued)

OTHER PUBLICATIONS

International Search Report for PCT/JP2014/056895 dated Jun. 3, 2014. [PCT/ISA/210].

(Continued)

*Primary Examiner* — Arun Williams
(74) *Attorney, Agent, or Firm* — Sughrue Mion, PLLC; Richard C. Turner

(57) ABSTRACT

A Si diode is used as a rectifying diode on a transformer secondary side of an isolated DC/DC converter, and a high-voltage Schottky barrier diode made of a wide bandgap semiconductor is used as a free-wheeling diode arranged between a rectifier circuit and a smoothing reactor. Thus, there may be provided an in-vehicle charger capable of suppressing a diode recovery surge voltage with a circuit configuration that is simpler and suppressed in cost increase as compared to a case where a related-art synchronous rectifier circuit system is employed.

8 Claims, 7 Drawing Sheets

(51) Int. Cl.
*H02M 7/06* (2006.01)
*B60L 11/18* (2006.01)
*H02M 3/335* (2006.01)
*H02J 7/02* (2016.01)
*H02M 1/00* (2006.01)

(52) U.S. Cl.
CPC ......... *B60L 11/1816* (2013.01); *H02J 7/0077* (2013.01); *H02M 7/066* (2013.01); *B60L 2210/10* (2013.01); *B60L 2210/30* (2013.01); *H02J 7/022* (2013.01); *H02M 3/3353* (2013.01); *H02M 3/33553* (2013.01); *H02M 2001/0051* (2013.01); *Y02T 10/7005* (2013.01); *Y02T 10/7072* (2013.01); *Y02T 10/7216* (2013.01); *Y02T 10/7241* (2013.01); *Y02T 10/92* (2013.01); *Y02T 90/127* (2013.01); *Y02T 90/14* (2013.01)

(58) Field of Classification Search
USPC ........................................................ 320/107
See application file for complete search history.

(56) References Cited

U.S. PATENT DOCUMENTS

| | | | | |
|---|---|---|---|---|
| 5,004,061 | A * | 4/1991 | Andruet | B60L 11/1805 180/65.51 |
| 2006/0145298 | A1* | 7/2006 | Omura | H01L 23/49562 257/547 |
| 2010/0078707 | A1* | 4/2010 | Haeberlen | H01L 29/7805 257/328 |
| 2012/0099232 | A1 | 4/2012 | Kuroyabu et al. | |
| 2012/0228626 | A1* | 9/2012 | Mochizuki | H01L 29/872 257/76 |
| 2012/0249059 | A1 | 10/2012 | Matsumae et al. | |
| 2013/0099768 | A1 | 4/2013 | Yonezawa et al. | |

FOREIGN PATENT DOCUMENTS

| | | |
|---|---|---|
| JP | 4-368464 A | 12/1992 |
| JP | 2000-166243 A | 6/2000 |
| JP | 2008-79403 A | 4/2008 |
| JP | 2011-14738 A | 1/2011 |
| JP | 2012-213260 A | 11/2012 |
| JP | 2013-27162 A | 2/2013 |
| JP | 2013-93970 A | 5/2013 |
| JP | 2013-207950 A | 10/2013 |
| KR | 10-1203882 B1 | 11/2012 |

OTHER PUBLICATIONS

Communication dated Jun. 26, 2017, issued from the European Patent Office in counterpart Application No. 14852887.0.

* cited by examiner td: DEAD TIME
Tdc: SWITCHING CYCLE

IN-VEHICLE CHARGER

CROSS REFERENCE TO RELATED APPLICATIONS

This application is a National Stage of International Application No. PCT/JP2014/056895 filed Mar. 14, 2014, claiming priority based on Japanese Patent Application No. 2013-211487 filed Oct. 9, 2013, the contents of all of which are incorporated herein by reference in their entirety.

TECHNICAL FIELD

The present invention relates to an in-vehicle charger for charging a battery for supplying power to an electric motor for an electric vehicle such as an electric car (EV) or a plug-in hybrid electric car (PHEV).

BACKGROUND ART

As types of electric vehicles, there are known a vehicle including only an electric motor as a drive source, and a hybrid vehicle including an electric motor and an engine as drive sources. The electric vehicle of any of those types includes a battery serving as an electricity storage device for supplying power to the electric motor, and the battery is required to be charged from the outside when the remaining capacity of the battery is low. Further, in the hybrid vehicle including the electric motor and the engine as the drive sources, in normal, the battery is charged by driving the engine. Note that, the battery is sometimes charged by supplying power from an external power supply without driving the engine.

In the electric vehicle including the electric motor as described above, an in-vehicle charger is mounted so as to enable charging of the battery with use of a household commercial power supply as the external power supply. The in-vehicle charger is configured to increase the voltage of the commercial power and convert the commercial power into DC power. In recent years, the electric vehicles such as the EV and the PHEV have become popular. As a result, the in-vehicle charger is desired to be reduced in size and cost by automobile manufacturers, and is desired to be increased in charging efficiency for reduction in battery charging time by users.

Further, the battery inside the electric vehicle is charged by the in-vehicle charger from the household commercial power supply via a public power network, and hence it can be said that the vehicle and the home environment are integrated. Therefore, as the electric vehicle becomes more popular, reliability and quality maintenance are required in both environments of electromagnetic compatibility (EMC) testing for electric vehicles and EMC testing for consumer devices associated with the public power network. Therefore, in such a case, the EMC regulations on the in-vehicle charger are stricter than those of general electrical components.

Note that, the in-vehicle charger generally includes an AC/DC converter and an isolated-type DC/DC converter (hereinafter referred to as "isolated DC/DC converter"). Further, in order to reduce the size and cost of the in-vehicle charger, reduction in size of magnetic components such as a transformer and a reactor is essential, and a higher switching frequency is desired. However, high frequency drive may cause problems such as increase in recovery loss of a diode and increase in surge voltage. In particular, in the case of the in-vehicle charger, a high-voltage battery is connected to the output side of the isolated DC/DC converter. Therefore, the surge voltage generated on the secondary side of the transformer is increased, which leads to fears of increase in withstanding voltage, increase in loss, and EMC deterioration of the element. Therefore, there is a demand for suppression of a surge voltage generated in a secondary-side rectifier circuit of the isolated DC/DC converter.

In view of this, as the first related art, there is known a DC/DC converter for suppressing the surge voltage by including an RCD snubber circuit (for example, see Patent Literature 1). Further, as the second related art, there is known a DC/DC converter for suppressing the surge voltage without including the RCD snubber circuit (for example, see Patent Literature 2).

CITATION LIST

Patent Literature

[PTL 1] JP 2008-79403 A
[PTL 2] JP 2000-166243 A

SUMMARY OF INVENTION

Technical Problem

However, the related art has the following problems. When the related art disclosed in Patent Literature 1 is applied to a high-voltage and large-power-output isolated DC/DC converter circuit included in the in-vehicle charger, a loss and heat generation of a snubber resistor used in the RCD snubber circuit are increased, and hence the rating of the snubber resistor itself is required to be increased. In such a case, the size of the snubber resistor is increased, which causes a problem in that the cost is increased. Further, in order to suppress the heat generation of the snubber resistor, improvement in cooling capacity is demanded, which causes a problem in that the size of the casing of the in-vehicle charger itself is increased. Therefore, the use of the RCD snubber circuit is avoided in the in-vehicle charger having demands of reduction in size and increase in power conversion efficiency.

In the related art disclosed in Patent Literature 2, a synchronous rectifier circuit system is used as the rectifier circuit of the isolated DC/DC converter. However, when this synchronous rectifier circuit system is applied to the high-voltage and large-power-output isolated DC/DC converter circuit included in the in-vehicle charger, switching elements of the synchronous rectifier circuit are required to be high-voltage components, which causes a problem in that the size is increased. Further, unlike a diode rectifier circuit system, the switching elements are driven in the synchronous rectifier circuit system, and hence a drive power supply and a drive circuit are required separately. Therefore, there has been a problem in that not only the size but also the cost is increased.

The present invention has been made to solve the above-mentioned problems, and has an object to provide an in-vehicle charger capable of suppressing a diode recovery surge voltage with a circuit configuration that is simpler and suppressed in cost increase as compared to a case where a related-art synchronous rectifier circuit system is employed.

Solution to Problem

According to one embodiment of the present invention, there is provided an in-vehicle charger, including: an AC/DC converter for converting an AC voltage applied from an external power supply into a DC voltage; and an isolated DC/DC converter for increasing the DC voltage generated by the AC/DC converter and applying the increased DC voltage to a battery for supplying stored power to an electric motor for driving a vehicle, to thereby supply power to the battery, the isolated DC/DC converter including: a rectifier circuit including rectifying diodes that are connected in a full-bridge configuration and are made of a Si semiconductor; a smoothing circuit; and a Schottky barrier diode arranged between the rectifier circuit and the smoothing circuit, the Schottky barrier diode being made of a wide bandgap semiconductor and being connected in parallel with the rectifier circuit.

Advantageous Effects of Invention

According to the one embodiment of the present invention, a Si diode is used as the rectifying diode on a transformer secondary side of the isolated DC/DC converter, and a high-voltage Schottky barrier diode made of the wide bandgap semiconductor is used as a free-wheeling diode arranged between the rectifier circuit and a smoothing reactor. Thus, there may be provided the in-vehicle charger capable of suppressing the diode recovery surge voltage with the circuit configuration that is simpler and suppressed in cost increase as compared to the case where the related-art synchronous rectifier circuit system is employed.

DESCRIPTION OF EMBODIMENTS

Now, an in-vehicle charger according to exemplary embodiments of the present invention is described referring to the accompanying drawings. In the illustration of the drawings, the same components are denoted by the same reference symbols, and the overlapping description thereof is herein omitted.

First Embodiment

Figure 1:
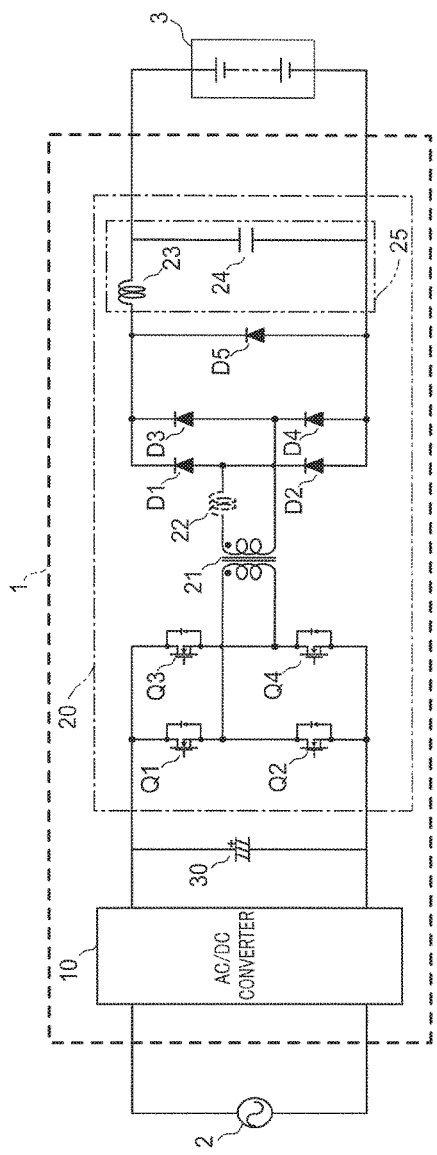
FIG. 1 is a schematic configuration diagram of an in-vehicle charger according to a first embodiment of the present invention.

FIG. 1 is a schematic configuration diagram of an in-vehicle charger 1 according to a first embodiment of the present invention. As illustrated in FIG. 1, on the input side of the in-vehicle charger 1, an AC voltage power supply 2 (hereinafter simply referred to as "AC power supply 2") serving as an external power supply (AC input power supply) is connected. Further, on the output side of the in-vehicle charger 1, a battery 3 having a high voltage (hereinafter referred to as "high-voltage battery 3") serving as a load is connected. The high-voltage battery 3 supplies stored power to an electric motor for driving a vehicle. Note that, design may be made so that the voltage of the high-voltage battery 3 is, for example, 100 V or more.

The in-vehicle charger 1 includes an AC/DC converter 10 for converting an AC voltage into a DC voltage, and an isolated DC/DC converter 20 for increasing the DC voltage generated by the AC/DC converter 10 and applying the increased DC voltage to the high-voltage battery 3, to thereby supply power to the high-voltage battery 3. Further, a capacitor 30 is connected between the AC/DC converter 10 and the isolated DC/DC converter 20.

The isolated DC/DC converter 20 includes four semiconductor switching elements Q1 to Q4, a transformer 21, a leakage inductance component of the transformer 21 (hereinafter referred to as "inductance component 22"), four rectifying diodes D1 to D4, a Schottky barrier diode D5, and a smoothing circuit 25 including a smoothing reactor 23 and a smoothing capacitor 24.

The four semiconductor switching elements Q1 to Q4 are connected to the output stage of the capacitor 30. For example, as those semiconductor switching elements Q1 to Q4, MOSFETs can be used. Further, drains of the semiconductor switching elements Q1 and Q3 are connected to the positive side of the capacitor 30, and sources of the semiconductor switching elements Q2 and Q4 are connected to the negative side of the capacitor 30.

One end of a primary winding of the transformer 21 is connected to a node between a source of the semiconductor switching element Q1 and a drain of the semiconductor switching element Q2, and the other end thereof is connected to a node between a source of the semiconductor switching element Q3 and a drain of the semiconductor switching element Q4.

A secondary winding of the transformer 21 is connected to the rectifying diodes D1 to D4 in a full-bridge configuration. Further, as the rectifying diodes D1 to D4, a diode made of an inexpensive silicon (Si) semiconductor is used. Note that, in the following, a diode made of a Si semiconductor is referred to as "Si diode".

In this case, when the synchronous rectifying system is employed, high-voltage semiconductor switching elements, a driver circuit for driving those switching elements, and a power supply are required, and hence the cost is increased. Further, when a high-voltage diode is used as the rectifying diode instead of the Si diode, the cost is remarkably increased. Therefore, in the first embodiment, as a rectifier circuit of the high-voltage isolated DC/DC converter, a rectifier circuit including Si diodes connected in full-bridge configuration is employed.

The smoothing circuit 25 including the smoothing reactor 23 and the smoothing capacitor 24 is connected to the output stage of the rectifying diodes D1 to D4. Further, between the smoothing circuit 25 and the rectifying diodes D1 to D4, the free-wheeling Schottky barrier diode D5 is connected. Further, as the Schottky barrier diode D5, a Schottky barrier diode made of a silicon carbide (SiC) semiconductor, which is a wide bandgap semiconductor having high withstanding voltage, good radiation performance, and small recovery, is used. Note that, in the following, the Schottky barrier diode D5 made of a SiC semiconductor is referred to as "SiC Schottky barrier diode D5".

Next, a basic operation of the isolated DC/DC converter 20 is described with reference to FIG. 2 and FIG. 3. Note that, the adopted isolated DC/DC converter 20 exemplified in the first embodiment is a general isolated DC/DC converter having a full-bridge configuration and employing a hard switching system as a switching system.

Figure 2:
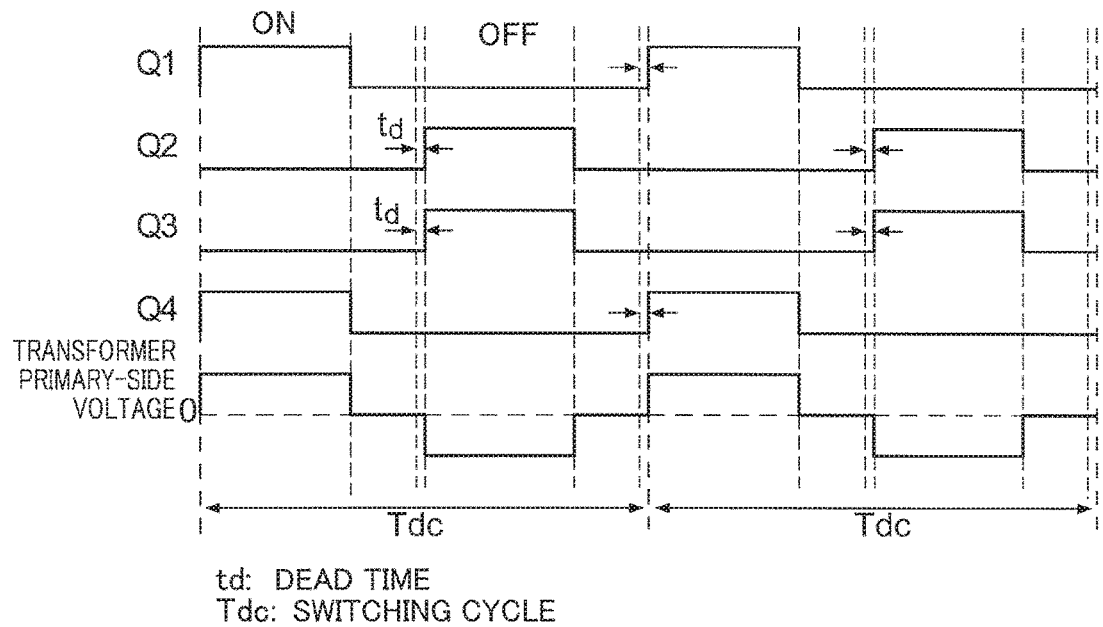
FIG. 2 is an explanatory diagram for illustrating an operation of semiconductor switching elements of an isolated DC/DC converter according to the first embodiment of the present invention.

FIG. 2 is an explanatory diagram for illustrating the operation of the semiconductor switching elements of the isolated DC/DC converter according to the first embodiment of the present invention. Note that, in FIG. 2, Tdc represents a switching cycle, and td represents a dead time.

As illustrated in FIG. 2, when the semiconductor switching elements Q1 and Q4 are turned on, a current flowing on the primary winding side (primary side) of the transformer 21 flows through each path in the order of the capacitor 30, the semiconductor switching element Q1, the transformer 21 (primary side), and the semiconductor switching element Q4. Further, the transformer 21 transmits power from the primary side to the secondary side. Subsequently, a current flowing on the secondary winding side (secondary side) of the transformer 21 flows through each path in the order of the transformer 21 (secondary side), the rectifying diode D1, the smoothing reactor 23, the high-voltage battery 3, and the rectifying diode D4.

Similarly, when the semiconductor switching elements Q2 and Q3 are turned on, a current flowing on the primary side of the transformer 21 flows through each path in the order of the capacitor 30, the semiconductor switching element Q3, the transformer 21 (primary side), and the semiconductor switching element Q2. Subsequently, a current flowing on the secondary winding side of the transformer 21 flows through each path in the order of the transformer 21 (secondary side), the rectifying diode D3, the smoothing reactor 23, the high-voltage battery 3, and the rectifying diode D2.

Figure 3:
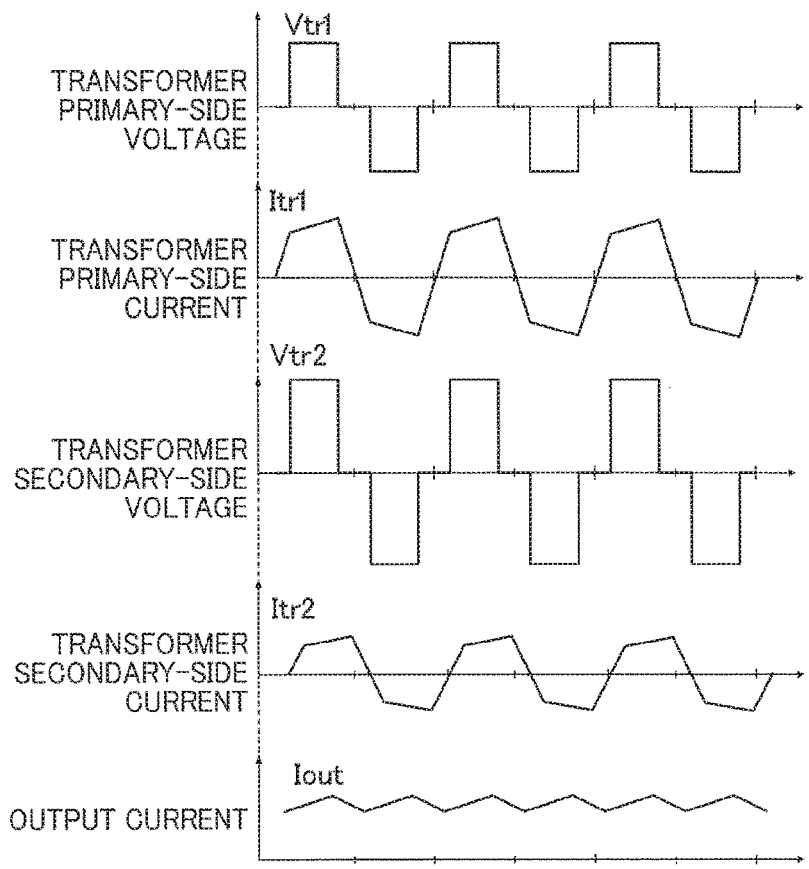
FIG. 3 is an explanatory diagram for illustrating each voltage/current waveform during the operation of the isolated DC/DC converter according to the first embodiment of the present invention.

FIG. 3 is an explanatory diagram for illustrating each voltage/current waveform during the operation of the isolated DC/DC converter 20 according to the first embodiment of the present invention. In this case, symbols in FIG. 3 are defined as follows.

Vtr1: primary-side voltage of transformer 21
Itr1: primary-side current of transformer 21
Vtr2: secondary-side voltage of transformer 21
Itr2: secondary-side current of transformer 21
Iout: current flowing through smoothing reactor 23

Further, as also illustrated in FIG. 2, in order to prevent short-circuiting, the dead time td is provided. Note that, the inductance component 22 is assumed as the leakage inductance component of the transformer 21, but the present invention is not limited thereto. A general reactor may be externally mounted.

Figure 4:
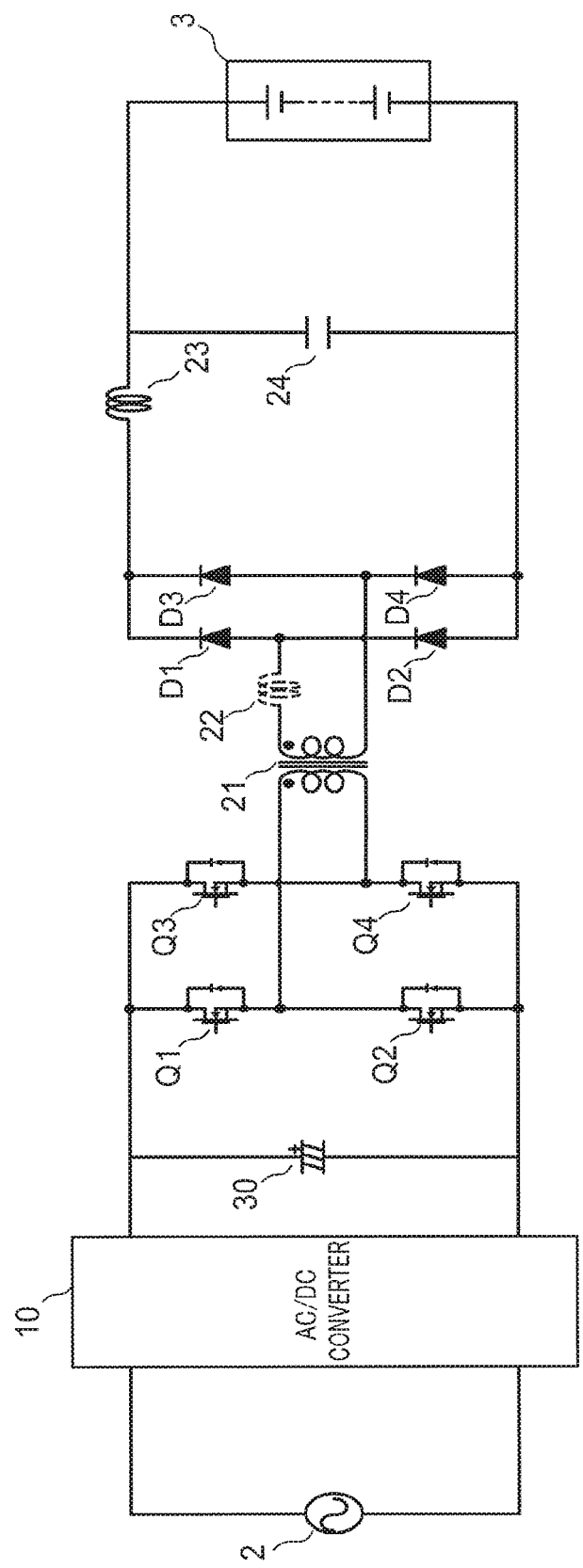
FIG. 4 is a circuit diagram of an in-vehicle charger using a general isolated DC/DC converter including semiconductor switching elements and diodes forming a full-bridge configuration, for describing the in-vehicle charger according to the first embodiment of the present invention.

Next, a mechanism of surge generation due to diode recovery is described with reference to FIG. 4 to FIG. 6. FIG. 4 is a circuit diagram of an in-vehicle charger using a general isolated DC/DC converter including semiconductor switching elements and diodes forming a full-bridge configuration, for describing the in-vehicle charger 1 according to the first embodiment of the present invention. FIGS. 5A to 5E are explanatory diagrams for illustrating current paths obtained when each of the semiconductor switching elements Q1 to Q4 in FIG. 4 is in an on/off state. Further, FIG. 5A to FIG. 5E are illustrations of temporal changes of the paths of currents flowing through the circuit of the in-vehicle charger in FIG. 4. FIG. 6 is an explanatory diagram for illustrating temporal changes of a current ID3 and a voltage VD3 of the rectifying diode D3 in FIG. 4.

Figure 5A:
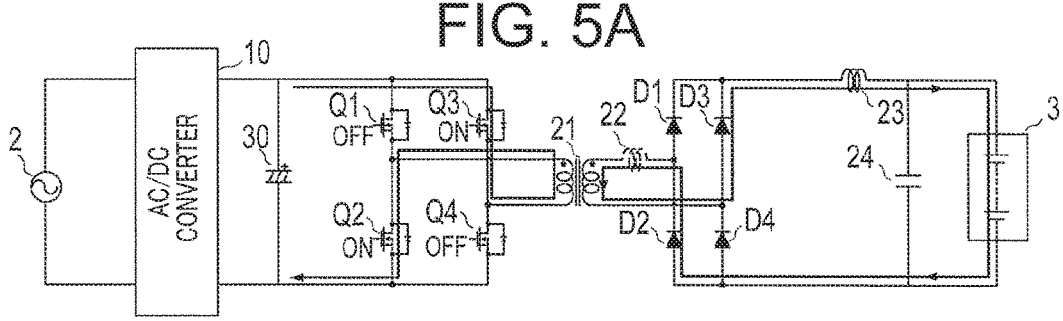
FIGS. 5A to 5E are explanatory diagrams for illustrating current paths obtained when each semiconductor switching element in FIG. 4 is in an on/off state.
Figure 5B:
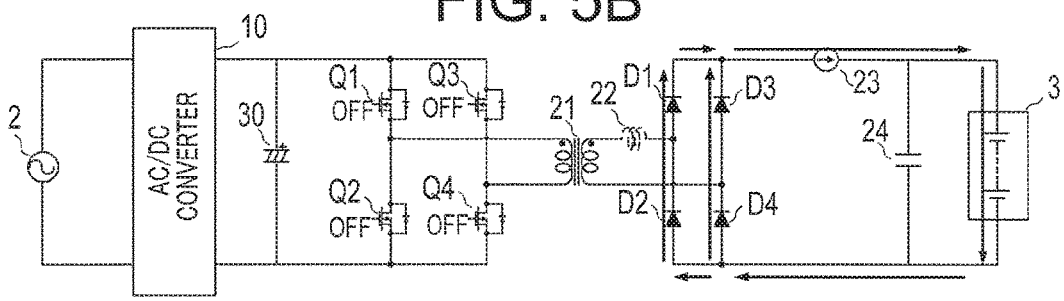
Figure 5C:
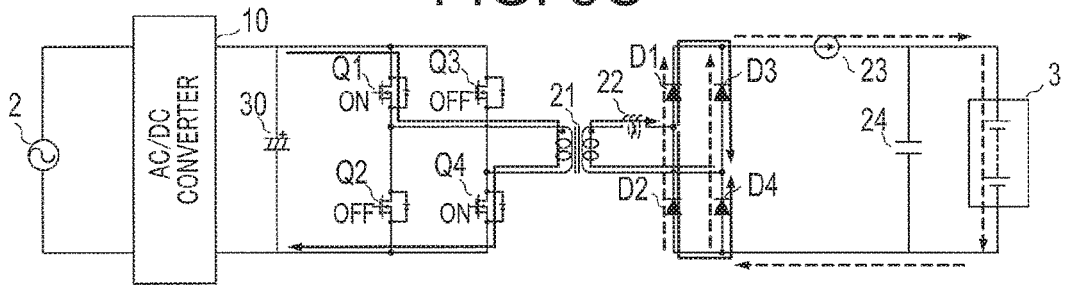
Figure 5D:
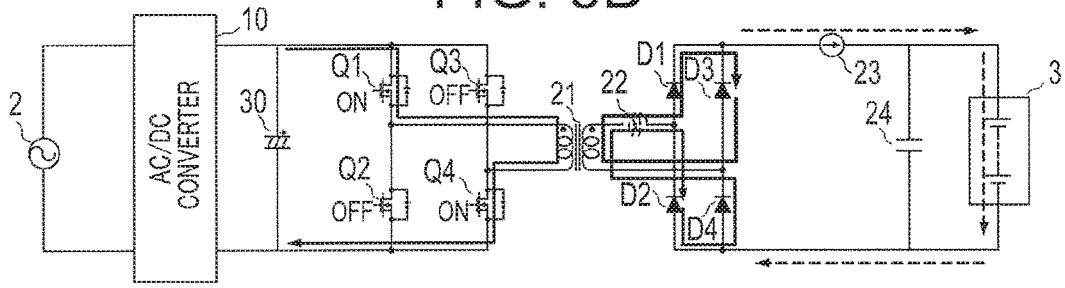
Figure 6:
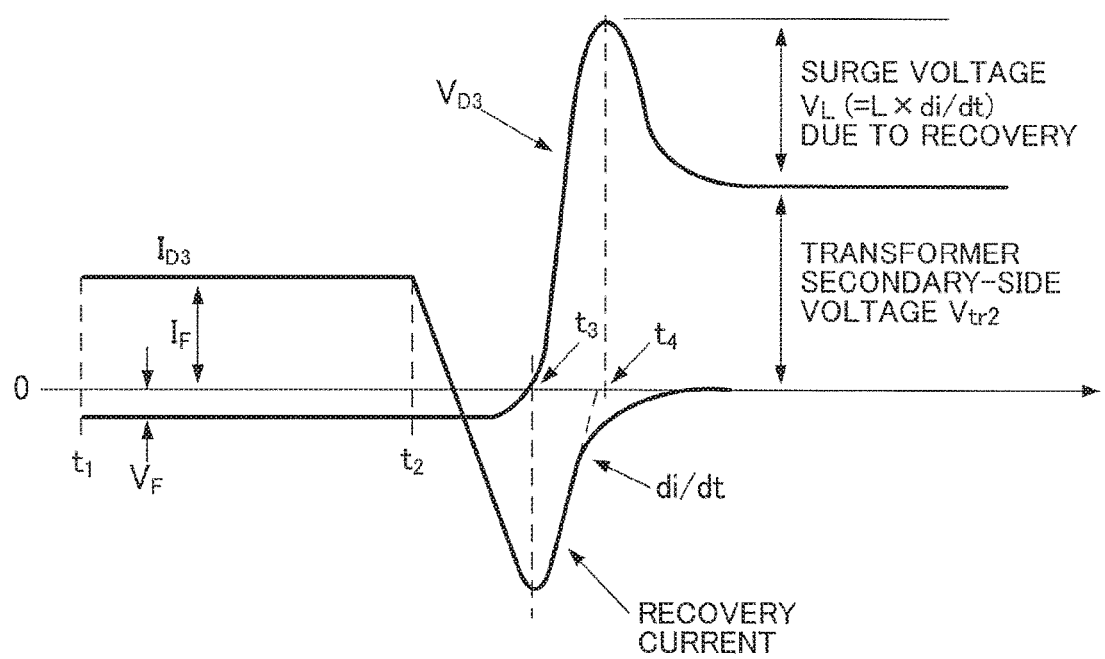
FIG. 6 is an explanatory diagram for illustrating temporal changes of a current and a voltage of a rectifying diode in FIG. 4.

At a time t0, when the semiconductor switching elements Q2 and Q3 are in an on state and the semiconductor switching elements Q1 and Q4 are in an off state, the paths of currents flowing on the primary side and the secondary side of the transformer 21 are the paths illustrated in FIG. 5A.

At a time t1, when all of the semiconductor switching elements Q1 to Q4 are turned off, no current flows on the primary side of the transformer 21. On the other hand, on the secondary side of the transformer 21, the smoothing reactor 23 attempts to cause the current to flow in the direction that the current has flowed just before (before the time t1), and hence the current flows. This is caused by the Lenz's law that, when change in magnetic flux occurs in the coil, a magnetic flux is generated in a direction to oppose the change in magnetic flux, to thereby cause an induced electromotive force. Therefore, at a moment when all of the semiconductor switching elements Q1 to Q4 are turned off, the smoothing reactor 23 is considered to correspond to a constant current source. Further, because all of the semiconductor switching elements Q1 to Q4 are turned off and no voltage is generated on the primary side of the transformer 21, no voltage is generated on the secondary side of the transformer 21 as well. Therefore, the path of the current flowing through the smoothing reactor 23 is the path illustrated in FIG. 5B.

Further, as illustrated in FIG. 6, at the time t=t1, the magnitude of the current ID3 of the rectifying diode D3 (hereinafter simply referred to as "current ID3") is IF, and the magnitude of the voltage VD3 of the rectifying diode D3 (hereinafter simply referred to as "voltage VD3") is VF.

At a time t2, when the semiconductor switching elements Q1 and Q4 are turned on, a voltage is generated on the primary side of the transformer 21, and hence a voltage is liable to be generated on the secondary side of the transformer 21 as well. However, the current flowing through the smoothing reactor 23 is flowing through the rectifying diodes D1 to D4 (corresponding to the dashed arrows in FIG. 5C), and hence short-circuiting virtually occurs on the secondary side of the transformer 21. In such a case, the path of the current flowing on the secondary side of the transformer 21 is the path of the solid arrows indicated in FIG. 5C. Note that, in FIG. 5C, as time elapses from the time t2, the current flowing through the rectifying diodes D1 and D4 is gradually increased, while the current flowing through the rectifying diodes D2 and D3 is gradually decreased.

Further, as illustrated in FIG. 6, at the time t2, similar to the time t1, the magnitude of the current ID3 is IF, and the magnitude of the voltage VD3 is VF.

At a time t3, at a moment when the current of the rectifying diodes D2 and D3 is decreased so that the forward current is 0 A or less, a recovery current (or a reverse recovery current) flows through the rectifying diodes D2 and D3. Then, the path of the recovery current flowing through the rectifying diodes D2 and D3 is the path illustrated in FIG. 5D. Note that, the rectifying diodes D2 and D3 may be in a state in which, even when a bias direction (polarity) is changed to apply a reverse bias from the on state in which the forward bias is applied, energization is possible by the stored carriers. In such a case, an excessively large current flows on the secondary side of the transformer 21.

Further, as illustrated in FIG. 6, as time elapses from the time t2, the magnitude of the current ID3 is decreased from IF to become 0. In such a case, a recovery current flows, and hence as time elapses from the time at which the magnitude of the current ID3 becomes 0, the magnitude is increased from 0 to become maximum at the time t3. Further, as time elapses from the time t2, the magnitude of the voltage VD3 is decreased from VF to become 0 at the time t3.

In this case, in the rectifying diodes D2 and D3, during the recovery operation process, as the stored carriers are decreased so that the reverse voltage of the PN junction is recovered, the recovery current is decreased and finally does not flow. However, depending on the decrease rate (=di/dt) of the recovery current and the inductance component 22 (=L), a surge voltage VL (=L×di/dt) is generated.

Figure 5E:
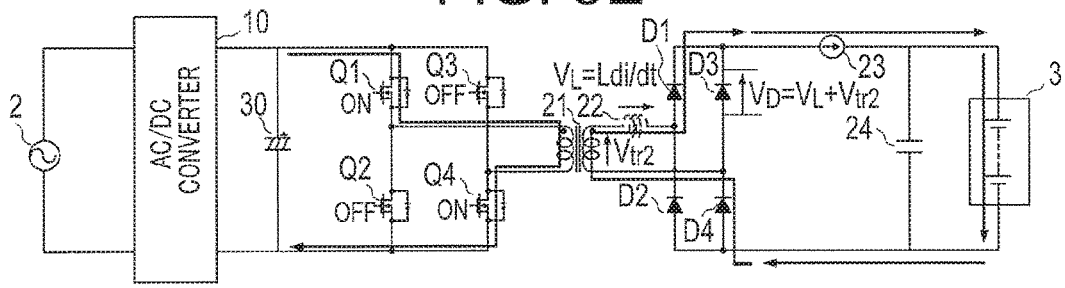

For example, at a time t4, across the rectifying diode D3, as illustrated in FIG. 5E, a total voltage VD (=VL+Vtr2) obtained as a sum of the secondary-side voltage Vtr2 of the transformer 21 and the surge voltage VL of the inductance component 22 is applied. Note that, the inductance component 22 being a leakage inductance of the transformer 21 is sufficiently larger than the inductance of the wiring or the pattern, and hence, in the first embodiment, the surge voltage VL is supposed as being generated by the inductance component 22.

Further, as illustrated in FIG. 6, as time elapses from the time t3, the magnitude of the current ID3 is gradually decreased to finally become 0 at the time t4 or thereafter. Further, as time elapses from the time t3, the magnitude of the voltage VD3 is increased from 0 so that the magnitude of the surge voltage VL becomes maximum at the time t4, and hence the magnitude of the voltage VD3 becomes maximum. Then, at the time t4 and thereafter, the magnitude of the voltage VD3 is gradually decreased to finally become equivalent to the magnitude of the transformer secondary-side voltage Vtr2.

As described above, an excessively large surge voltage VL is generated in the rectifying diodes D1 to D4 of the high-voltage and high-frequency drive isolated DC/DC converter 20, and hence, in general, a circuit for suppressing the surge voltage VL is required. However, as described above, it is difficult to use a snubber circuit in the in-vehicle charger.

In view of this, as the rectifying diodes D1 to D4, four SiC Schottky barrier diodes are used. In this manner, the surge voltage due to the diode recovery can be significantly decreased, and a converter circuit without a snubber circuit can be realized. The reason is as follows. The SiC Schottky barrier diode is a unipolar device, and unlike a bipolar device typified by a Si diode or an FRD, no minority carrier is stored. As a result, the reverse recovery time of the diode is faster than that of the FRD, and further there is no temperature dependence.

However, the SiC diode is more expensive than a general Si diode. Therefore, when four SiC Schottky barrier diodes are used as the rectifying diodes D1 to D4, there arises a problem in that the cost of the in-vehicle charger itself is remarkably increased.

In view of this, as illustrated in FIG. 1 referred to above, in the isolated DC/DC converter 20 of the in-vehicle charger 1 according to the first embodiment, the Si diodes that are lower in cost than the SiC diodes are used as the rectifying diodes D1 to D4, while the SiC Schottky barrier diode D5 is used as the free-wheeling diode newly arranged between the smoothing circuit 25 and the rectifying diodes D1 to D4.

By forming the isolated DC/DC converter 20 as described above, a surge suppression effect substantially equivalent to the case where four SiC Schottky barrier diodes are used as the rectifying diodes D1 to D4 can be exerted.

Next, the mechanism of suppressing the surge in the isolated DC/DC converter 20 of the in-vehicle charger 1 according to the first embodiment of the present invention is described with reference to FIGS. 7A to 7E and FIG. 8. FIGS. 7A to 7E are explanatory diagrams for illustrating current paths obtained when each of the semiconductor switching elements Q1 to Q4 of the in-vehicle charger 1 according to the first embodiment is in an on/off state. Further, FIG. 7A to FIG. 7E are illustrations of temporal changes of the paths of currents flowing through the circuit of the in-vehicle charger 1.

Figure 8:
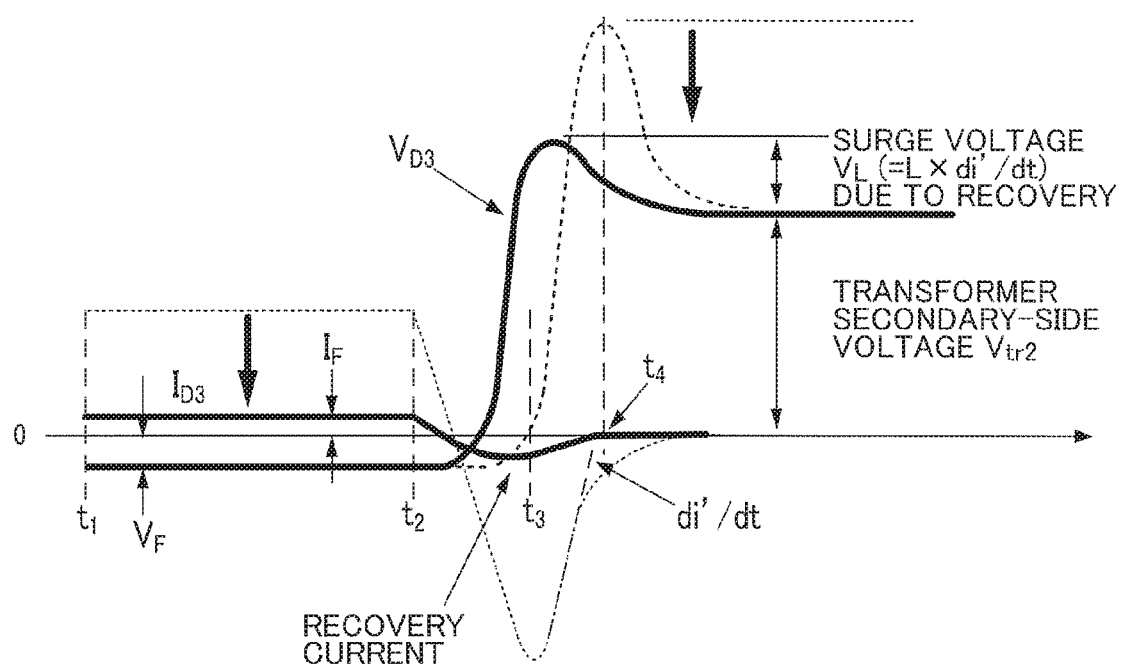
FIG. 8 is an explanatory diagram for illustrating temporal changes of a current and a voltage of a rectifying diode of the in-vehicle charger according to the first embodiment.

FIG. 8 is an explanatory diagram for illustrating temporal changes of the current ID3 and the voltage VD3 of the rectifying diode D3 of the in-vehicle charger 1 according to the first embodiment. Note that, in FIG. 8, the temporal changes of the current ID3 and the voltage VD3 of the rectifying diode D3 of the in-vehicle charger 1 are indicated by the solid lines, and for comparison, the temporal changes of the current ID3 and the voltage VD3 of the rectifying diode D3 of the in-vehicle charger devoid of the SiC Schottky barrier diode D5 (FIG. 6 referred to above) are indicated together by the broken lines.

Figure 7A:
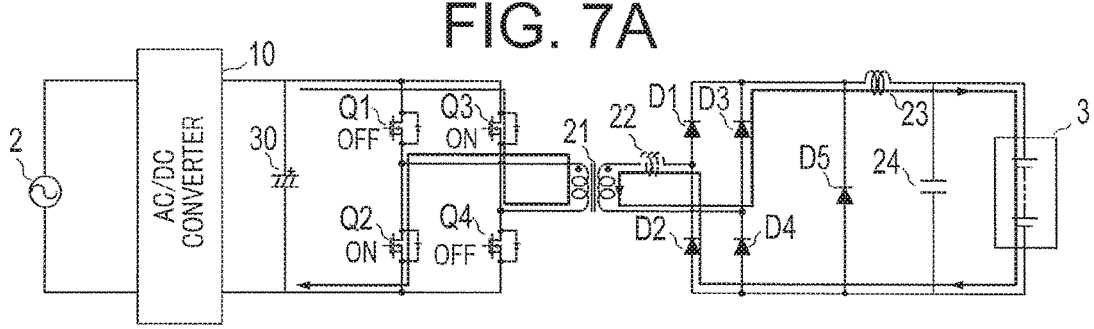
FIGS. 7A to 7E are explanatory diagrams for illustrating current paths obtained when each semiconductor switching element of the in-vehicle charger according to the first embodiment is in an on/off state.

At the time t0, when the semiconductor switching elements Q2 and Q3 are in an on state and the semiconductor switching elements Q1 and Q4 are in an off state, the paths of currents flowing on the primary side and the secondary side of the transformer 21 are the paths illustrated in FIG. 7A. Note that, those current paths are the same as the current paths illustrated in FIG. 5A described above.

Figure 7B:
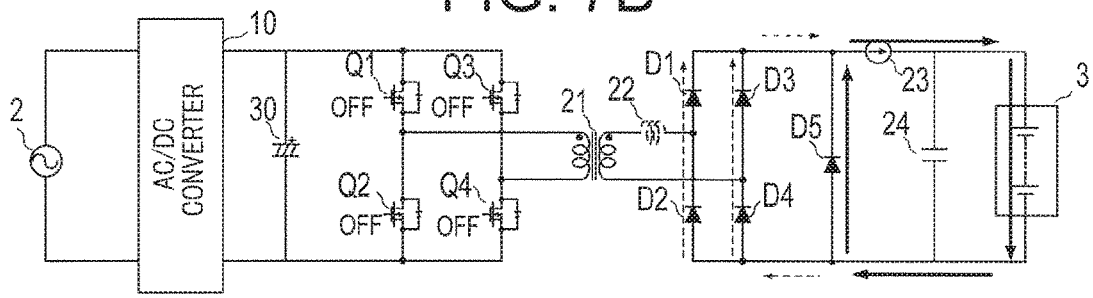

At the time t1, when all of the semiconductor switching elements Q1 to Q4 are turned off, no current flows on the primary side of the transformer 21. On the other hand, on the secondary side of the transformer 21, the smoothing reactor 23 attempts to cause the current to flow in the direction that the current has flowed just before (before the time t1), and hence the smoothing reactor 23 corresponds to a constant current source. At this time, in the in-vehicle charger 1 according to the first embodiment of the present invention, as illustrated in FIG. 7B, a large part of the current flowing through the smoothing reactor 23 flows through the SiC Schottky barrier diode D5.

In this case, the rectifying diode D1 and the rectifying diode D2 are connected to each other in series, and the rectifying diode D3 and the rectifying diode D4 are connected to each other in series. Further, when the current flowing through the smoothing reactor 23 flows through the rectifying diodes D1 to D4, forward voltage drop of two diodes (=2Vf) is caused, whereas, in the SiC Schottky barrier diode D5, forward voltage drop of only one diode (=Vf) is caused. Further, the SiC Schottky barrier diode D5 is arranged between the smoothing reactor 23 and the rectifying diodes D1 to D4, and hence the wiring impedance is low. As a result, a large part of the current flowing through the smoothing reactor 23 flows through the SiC Schottky barrier diode D5 having a sufficiently low impedance, and hence almost no current flows through the rectifying diodes D1 to D4.

Figure 7C:
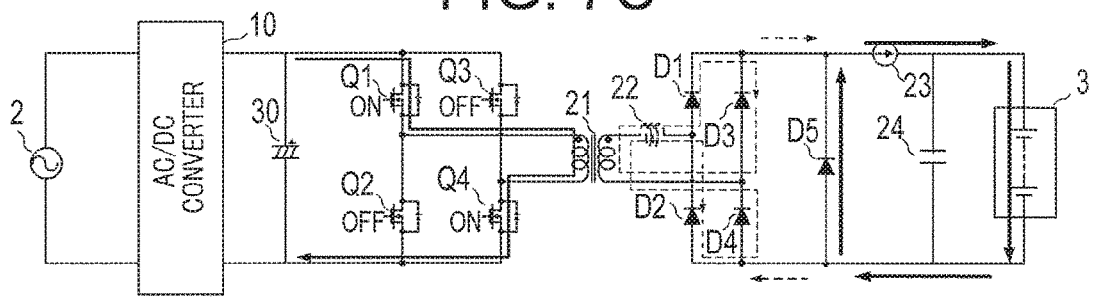

At the time t2, when the semiconductor switching elements Q1 and Q4 are turned on, almost no forward current is flowing through the rectifying diodes D2 and D3 just before, and hence, as illustrated in FIG. 7C, almost no recovery is caused. Therefore, as illustrated in FIG. 8, the surge voltage VL is significantly decreased.

Figure 7D:
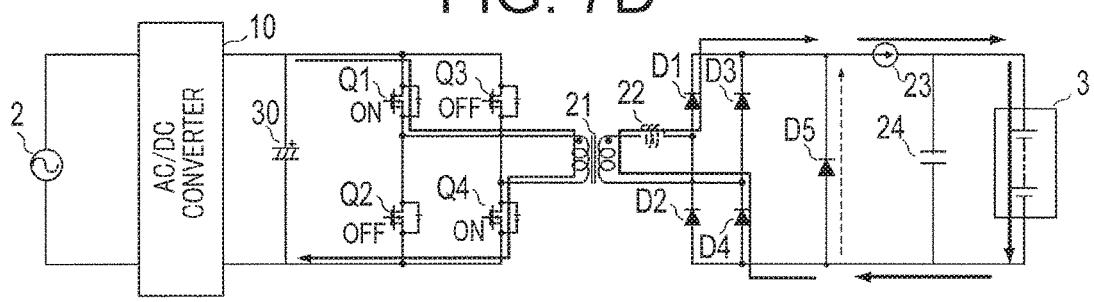
Figure 7E:
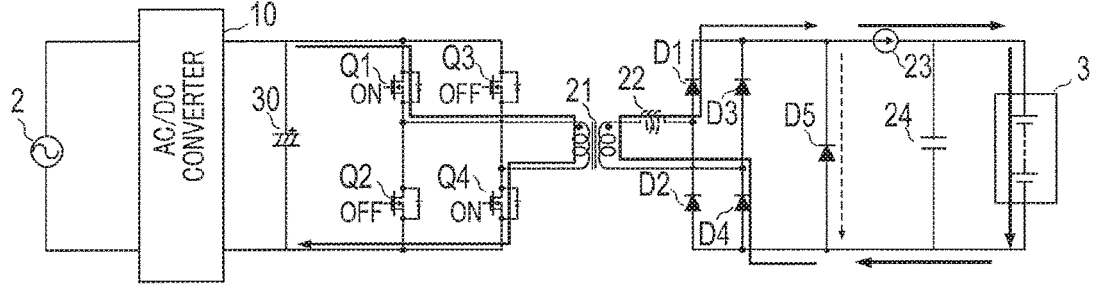

After the recovery of the rectifying diodes D2 and D3 is ended, at the time t4 and thereafter, as illustrated in FIG. 7D and FIG. 7E, a secondary-side current of the transformer 21 flows through the rectifying diodes D1 and D4. Further, a reverse voltage is applied to the SiC Schottky barrier diode D5, and hence the current flowing through the SiC Schottky barrier diode D5 is decreased.

In this case, a large part of the current flowing through the smoothing reactor 23 has been caused to flow through the SiC Schottky barrier diode D5, and hence the forward current of the SiC Schottky barrier diode D5 is sufficiently larger than the forward current of the rectifying diodes D2 and D3.

However, as described above, no minority carrier is stored in the SiC Schottky barrier diode D5, and almost no recovery is caused. Note that, it is described that almost no recovery is caused because, in the actual case, there is only a transient flow of a current that charges and discharges the junction capacitance at the Schottky barrier diode surface. Therefore, as illustrated in FIG. 8, the current ID3 and the voltage VD3 of the rectifying diode D3 can have the temporal change characteristics as indicated by the solid lines.

As described above, according to the first embodiment, a Si diode is used as the rectifying diode of the rectifier circuit of the isolated DC-DC converter forming the in-vehicle charger, and a SiC Schottky barrier diode is used as the free-wheeling diode arranged between the rectifier circuit and the smoothing circuit. With this, almost no forward current just before recovery flows through the rectifying diode, and hence the recovery is significantly decreased. On the other hand, the SiC Schottky barrier diode is used as the free-wheeling diode through which a large part of current flows when all of the semiconductor switching elements are in an off state, and hence almost no recovery is caused.

In other words, four Si diodes are used as the rectifying diodes of the isolated DC-DC converter forming the in-vehicle charger and one SiC Schottky barrier diode is used as the free-wheeling diode, to thereby obtain effects similar to those obtained when four SiC Schottky barrier diodes are used as the rectifying diodes. Therefore, the in-vehicle charger to be mounted in the electric vehicle described in the first embodiment requires no special snubber circuit, and it is only required to add one Schottky barrier diode made of a wide bandgap semiconductor. Thus, as compared to the case where the related-art synchronous rectifier circuit system is employed, the diode recovery surge voltage can be suppressed with a circuit configuration that is simpler and suppressed in cost increase.

Note that, in the first embodiment, a case where the SiC Schottky barrier diode is used as the free-wheeling diode is described as an example, but as such a free-wheeling diode, there may be used a Schottky barrier diode made of another wide bandgap semiconductor different from the SiC semiconductor, which has a larger bandgap than Si. Specifically, for example, when a gallium nitride based material or diamond is used as the wide bandgap semiconductor, effects similar to those of SiC can be obtained.

In particular, a gallium nitride (GaN) based material enables higher frequency operation as compared to Si or SiC. This is because the GaN based material can use a two-dimensional electron gas, and is higher in electron concentration and carrier mobility than Si or SiC. Further, the GaN based material is lower in heat conductivity than SiC, and is relatively suitable for use in devices having small power capacity. That is, in a high-voltage and high-frequency drive in-vehicle charger with a relatively small power capacity, it is more effective to use a Schottky barrier diode made of a semiconductor of a GaN based material as the free-wheeling diode.

The invention claimed is:

1. An in-vehicle charger, comprising:
an AC/DC converter for converting an AC voltage applied from an external power supply into a DC voltage; and
an isolated DC/DC converter for increasing the DC voltage generated by the AC/DC converter and applying the increased DC voltage to a battery for supplying power stored by itself to an electric motor for driving a vehicle, to thereby supply power to the battery,
the isolated DC/DC converter comprising:
a rectifier circuit comprising rectifying diodes that are connected in a full-bridge configuration and are made of a Si semiconductor;
a smoothing circuit; and
a Schottky barrier diode arranged between the rectifier circuit and the smoothing circuit, the Schottky barrier diode being made of a wide bandgap semiconductor and being connected in parallel with the rectifier circuit.

2. An in-vehicle charger according to claim 1, wherein the wide bandgap semiconductor comprises any one of silicon carbide, a gallium nitride based material, and diamond.

3. An in-vehicle charger according to claim 1, wherein a switching system of the isolated DC/DC converter comprises a hard switching system.

4. An in-vehicle charger according to claim 2, wherein a switching system of the isolated DC/DC converter comprises a hard switching system.

5. An in-vehicle charger according to claim 1, wherein a voltage of the battery is 100 V or more.

6. An in-vehicle charger according to claim 2, wherein a voltage of the battery is 100 V or more.

7. An in-vehicle charger according to claim 3, wherein a voltage of the battery is 100 V or more.

8. An in-vehicle charger according to claim 4, wherein a voltage of the battery is 100 V or more.

* * * * *